United States Patent [19]
Crowley

[11] 3,857,782

[45] Dec. 31, 1974

[54] SEMIPERMEABLE MEMBRANE PROCESS AND DEVICE EMPLOYING AN AMINOETHYLATED POLYMERIC MATERIAL AS THE SEMIPERMEABLE MEMBRANE

[75] Inventor: Richard P. Crowley, Wellesley Hills, Mass.

[73] Assignee: Abcor, Inc., Cambridge, Mass.

[22] Filed: Nov. 4, 1971

[21] Appl. No.: 195,881

Related U.S. Application Data

[62] Division of Ser. No. 35,248, May 6, 1970, abandoned.

[52] U.S. Cl. ................. 210/22, 210/23, 210/321, 210/500
[51] Int. Cl. .................. B01d 31/00, B01d 13/00
[58] Field of Search ............. 210/22, 23, 321, 520

[56] References Cited
UNITED STATES PATENTS

| | | | |
|---|---|---|---|
| 3,276,598 | 10/1966 | Michaels et al. | 210/500 |
| 3,342,724 | 9/1967 | Strand | 210/500 X |
| 3,472,766 | 10/1969 | Rosenbaum | 210/500 X |
| 3,620,970 | 11/1971 | Klug et al. | 210/500 X |

*Primary Examiner*—Frank A. Spear, Jr.
*Attorney, Agent, or Firm*—Richard P. Crowley

[57] ABSTRACT

An improved permeation process particularly useful for separating low molecular weight solids, such as urea and salts as in osmotic and dialytic separation processes, employs a semipermeable membrane material characterized by having polyaminoethylene grafts. Aminoethylated polymeric materials, such as cellulose and polyamides or polyethylene imine are employed in capillary fiber form in permeation processes and devices which materials exhibit improved permeation rates, particularly for low molecular weight solids in aqueous solutions.

9 Claims, No Drawings

SEMIPERMEABLE MEMBRANE PROCESS AND DEVICE EMPLOYING AN AMINOETHYLATED POLYMERIC MATERIAL AS THE SEMIPERMEABLE MEMBRANE

This is a division of application Ser. No. 35,248, filed May 6, 1970, now abandoned.

BACKGROUND OF THE INVENTION

Separatory processes employing semipermeable membranes in tubular, flat sheet, capillary fiber and other forms have been increasingly employed to separate various solutions, particularly for the separation of those solution components which cannot be readily separated by conventional separation techniques. In particular, extracorporeal hemodialysis as well as the desalination of sea water or brackish water has been carried out employing semipermeable processes which utilizes polymeric material such as cellulose esters like cellulose acetate, cellulose, polyamides, olefins and other polymers as the permeable membrane material. Typical processes and devices for utilizing capillary fibers have been set forth in U.S. Pat. No. 3,228,876, issued Jan. 11, 1966. Polyamide polymers having Polyoxyethylene grafts have been prepared for use in a separatory process as set forth in U.S. Pat. No. 3,472,766 issued Oct. 14, 1969. There is accordingly, a need for new and improved polymeric materials for use as semipermeable membranes, particularly materials which have an improved permeation rate for low molecular weight solids, such as urea and salts in water solutions.

SUMMARY OF THE INVENTION

My invention relates to an improved separatory process and device utilizing polymeric materials with amino alkylene grafts as a semipermeable membrane material to provide improved permeation rates. My invention is particularly applicable to the use of poly(ethylene imine) polymeric materirals in capillary fiber form for the separation of low molecular weight solids, such as urea and salts of a water solution, such as in a hemodialysis process or the desalination of sea water and brackish water. My improved process permits the use of poly(ethylene imine) polymeric materials, such as cellulose ethers and esters, cellulose, polyamides, and other polymeric materials which react with ethylene imines in semipermeable membrane devices to provide enhanced separatory ability and improved permeation rates.

The semipermeable polymeric materials of my invention comprise those polymeric materials which contain polyethylene imine grafts thereon in the range from about 5 to 60 percent by weight of the combined ethylene imine. My process comprises: contacting under fluid pressure on one side of a selected permeable polymeric membrane material which contains polyethylene imine graft groups, a fluid having at least one component thereof which is permeable through the membrane material; and thereafter collecting a permeaterich stream containing the component in increased concentration which permeates through the membrane. Fluid pressure is meant to include osmotic pressure, hydrostatic pressure, additionally applied pressure of above atmospheric pressure and other means of employing a driving force such as electrodialysis and the like in the use of semipermeable membrane devices employing my improved polymeric membrane materials.

DESCRIPTION

The polymeric permeable membranes of my invention are prepared from a polymeric material having a group which is reactive to or with an alkylene imine, such as ethylene imine and alkyl substituents. Polymeric membrane materials are prepared by reacting, for example, ethylene imine with a polymeric material containing a reactive group, such as an NH or OH group in order to incorporate into the polymeric material from about 5 to 60 percent or more, for example, 10 to 25 percent of a polyethylene imine group, thereby enhancing the permeation rate of the polymeric material, particularly when employing aqueous solutions. My semipermeable membrane materials may be prepared by reacting the polymeric material with ethylene imine to incorporate substituted polyethylene imine grafts into the polymer. The polymer material may be reacted in bulk, solid, granular, tubular, or capillary fiber or other form. The preferred reactant of may invention is ethylene imine, which reaction is carried out under ring-opening reaction conditions with the polymeric material. Typical N-alkyl ethylene imine compounds which may be employed include but are not limited to: $C_2$-$C_4$ alkyl-ethylene imines such as N-methyl-ethylene imine, 2-methyl-ethylene imine, N-ethyl-ethylene imine, 2-ethyl-ethylene imine, 2,2-dimethyl-ethylene imine, N-n-butyl-ethylene imine, and N-tertiary-butyl-ethylene imine. The ethylene imine is reacted usually under pressure with the polymeric materials under ring-opening reaction cnditions. Typical reactions are carried out in the presence of acid like hydrochloric acid or acid-type catalysts and the reaction is exothermic with the resulting reaction product being more water-soluble than the product from which it is derived.

The polymeric materials which may be employed in preparing my improved semipermeable membrane materials would include those polymeric materials which are reactive with ethylene imine or have a group reactive with ethylene imine and of which it is desired to impart or improve the permeation rate of the polymeric material in a semipermeable membrane process. Typical polymeric materials would include, but not be limited to, those polymers having an NH group such as the polyamide or nylon-type polymers, such as those nylons produced by reacting a diamine with a dicarboxylic acid or by condensation of an amino carboxylic acid. Typical nylons would include the polycaprolactam and hexamethylene diamine condensed with adipic acid, such as 6-nylon, nylon 6—6, nylon 6–10, nylon 11 and the like. Other polymeric materials which contain reactive groups with ethylene imine would include rayon and cellulosic materials like cellulose, cellulose ethers and cellulose esters, such as the esters and ethers of short-chain fatty acids like cellulose acetate which contains residual OH groups as well as cellulose.

The improved polymers containing ethylene imine grafts useful in preparing or treating hollow capillary fibers include the homo and copolymerizable polymers of ethylene imines, particularly polyethylene imine, such as the polyethylene imines adapted to be molded or extruded into hollow capillary fibers. Polyethylene may be blended with other compatible polymeric materials, e.g., in amounts of greater than about 20 percent by weight to enhance the permeation rates and aqueous wetting characteristics of fibers formed therefrom. Typically, the polymeric materials contain from 10 to 100, e.g., 20 to 50 ethylene imine graft groups.

In general, the polymeric material reacted with the ethylene imine may be reacted by treatment of the solid polymer in ground, powdered, pellet, granular or in fiber shape with an excess ethylene imine for various periods of time of from 1 to 100 hours; for example, 2 to 50 hours. The reaction is carried out in a stainless steel bomb or other reaction vessels, since the reaction is exothermic The temperature of reaction may vary from about 40° to 80°C and often under greater than atmospheric pressure. In general, the longer the reaction time, the greater the amount of the combined ethylene imine content of the resulting polymer. After the reaction, the steel bomb is cooled, opened and the excess imine evaporated or recovered.

The poly(ethylene imine) polymeric materials may be fabricated before or after reaction into a hollow fiber, film, flat sheet or other form, depending upon the type of the semipermeable apparatus employed. Typically, my amino ethylated polymeric material is formed into hollow capillary fiber form or employed in a solution and then cast on the interior of a supported tube like a braided fiber, sintered polymer or glass fiber tube to form an integral tubular membrane. The semipermeable membrane thickness may range from about 2 to 100 mils. In general, as the percent of the combined amino ethylene increases, the permeability of the polymeric membrane materials through low molecular solutes is enhanced; that is, the low molecular weight salt and water permeability is increased. Generally, it is preferred to employ a polymeric membrane material containing from about 10 to 60 percent by weight of combined ethylene imine for a high permeable membrane, such as for hydrophilic solutes like water. Such a membrane would have particular interest in the fields of extracorporeal hemodialysis; that is, artificial kidneys and for separating sea water and brackish water in a reverse osmosis or ultrafiltration process. Where the exterior of the material like a tube or capillary is treated with the ethylene imine reactant, then in such cases, the polyethylene imine graft groups are primarily on the surface. Accordingly, the polymeric material containing the amino ethoxy groups are usefully employed as semipermeable membranes in all manner of osmotic and dialytic processes.

My invention is illustrated by the following examples:

EXAMPLE I

An improved poly(ethylene imine) polymeric material useful as a semipermeable membrane in having an improved permeation rate for separating low molecular weight solids such as urea and salts from a water solution, for example, as in an artificial kidney is prepared by: reacting a 20-gram sample of a commerical nylon 6—6 ground to pass a 20-mesh sieve with an excess of about 100 mls. of ethylene imine in a Parr bomb, the reaction mixture then heated to about 60° to 80°C for 40 hours. After cooling the excess ethylene imine is allowed to evaporate and the remaining material is washed several times with water in a Waring Blendor and then dried. The polymeric product produced is granular and somewhat rubbery and contains from about 40 to 60 percent by weight of the combined ethylene imine. The polyethylene imine graft nylon so prepared may then be formed into film form of approximately 2 to 4 mils in thickness for testing its permeation properties. The permeability of the thin film formed from such polyethylene imine graft nylon when tested against an unreacted nylon 6—6 in similar film form exhibits a higher water permeation rate when the films are exposed to a sodium chloride and urea solution.

EXAMPLE II

An improved polyethylene imine graft polymer of cellulose acetate which contains approximately 10 to 20 percent by weight of the combined ethylene imine is prepared by reacting 10 grams of cellulose acetate having an acetyl content from about 5 to 30 percent with about 50 mls of ethylene mine for 7 to 20 hours. The resultant polymeric material exhibits improved water permeation rates as compared to unreacted material, thereby permitting the separation of salts and urea from a water solution containing said salt and urea. Cellulose and cellulose acetate containing the polyethylene imine grafts, which polymers are placed in capillary fiber form and in membrane devices similar to that set forth in U.S. Pat. No. 3,228,876 are particularly effective in use for artificial kidneys.

What is claimed is:

1. In a separatory process which comprises: exposing under fluid pressure one side of a selected polymeric permeable membrane to a fluid having at least one component permeable to said membrane, and separating that portion of the fluid which permeates the membrane from that portion of the fluid which does not permeate the membrane, the improvement which comprises:

employing as the selected permeable polymeric membrane material a polymer selected from the group consisting of polyethylene imine and a polyamide containing reactive NH groups and modified by the reaction of the NH groups of the polyamide with an ethylene imine to contain from about 5 to 60 percent by weight ethylene imine, generally in the form of polyethylene imine grafts thereon.

2. The process of claim 1 wherein said membrane is a hollow capillary fiber.

3. The process of claim 1 wherein the membrane has a high permeability to low molecular weight components and contains from about 40 to 65 percent by weight of combined ethylene imine.

4. A reverse osmosis process according to the process of claim 1 wherein the membrane contains from about 10 to 40 percent by weight of combined ethylene imine.

5. The process of claim 1 wherein said membrane is in a tubular form, the membrane material cast onto the internal portion of a tubular support.

6. The process of claim 1 wherein the membrane is exposed to a fluid which comprises a water solution containing urea, salts and proteinaceous matter and which membrane has a selectivity which permits the passage of the water, salt and urea.

7. The process of claim 1 wherein the membrane is a hollow capillary fiber and in which the exterior portion of the fiber material has been reacted with the ethylene imine.

8. The process of claim 1 wherein the ethylene imine is an alkyl ethylene imine.

9. The capillary fibers prepared by the process of claim 2.

* * * * *